United States Patent Office 3,481,774
Patented Dec. 2, 1969

3,481,774
TREATMENT OF WOOD AND RESULTING TREATED PRODUCT
Marwan R. Kamal, Minneapolis, and Don E. Floyd, Robbinsdale, Minn., assignors to General Mills, Inc., a corporation of Delaware
No Drawing. Filed Sept. 27, 1966, Ser. No. 582,267
Int. Cl. B44d 1/28, 1/30, 1/12
U.S. Cl. 117—148
10 Claims

ABSTRACT OF THE DISCLOSURE

Wood is impregnated with an organic polyisocyanate having the formula $$[R\!\!+\!\!(CH_2)_yNCO]_x$$

where $y$ is 0 or 1, $x$ is an integer of 2 to about 4 and R is the hydrocarbon group of polymeric fat acids to improve the dimensional stability of the wood. The impregnated wood is also preferably coated with a protective resinous coating and especially with a polyurea coating.

---

The present invention relates to the treatment of wood with certain polyisocyanates. More particularly, it relates to the treatment of wood with polyisocyanates derived from polymeric fat acids. It also relates to the resulting treated wood product.

Wood has a tendency to discolor upon exposure, especially to ultraviolet radiation. In addition, wood tends to absorb moisture and thus expand to the point where cracking results. These effects are particularly pronounced in softwoods. And such objectionable results of exposure are especially undesirable when the wood is coated with a clear finish and then the coated wood is used in such applications where it is continuously exposed to the elements. It would be particularly desirable to be able to alleviate or substantially reduce this dimensional instability of wood.

It is, therefore, an object of the present invention to provide a treatment for wood which substantially reduces or alleviates the tendency of the wood to discolor and/or crack. Another object of the present invention is to provide a method of treating wood with certain polyisocyanates to materially improve the properties of the wood. Still another object of the invention is to provide a process for treating wood with polyisocyanates derived from polymeric fat acids. A further object of the invention is to provide such a method wherein the treated wood is also coated with a protective resinous coating. Additionally, it is an object of our invention to provide improved treated wood products or articles. These and other objects will become apparent from the following detailed description.

We have now discovered that the dimensional instability of wood can be materially reduced by treating the same with polyisocyanates derived from polymeric fat acids. The so-treated wood has a substantially reduced tendency to discolor upon exposure to ultraviolet radiation and to crack upon moisture absorption.

The polyisocyanates employed in the present invention have the following idealized, structural formula:

$$[R\!\!+\!\!(CH_2)_yNCO]_x$$

where $y$ is 0 or 1, $x$ is an integer of 2 to about 4 and R is the hydrocarbon group of polymeric fat acids.

The polyisocyanates wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3R(COOH)_2 + 2PCl_3 \longrightarrow 3R(COCl)_2 + 2H_3PO_3$$
$$R(COCl)_2 + 2NaN_3 \longrightarrow R(CON_3)_2 + 2NaCl$$
$$R(CON_3)_2 \xrightarrow{\Delta} R(NCO)_2 + 2N_2$$

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

$$R(COOH)_2 + 2NH_3 \longrightarrow R(CN)_2 + 4H_2O$$
$$R(CN)_2 + 4H_2 \xrightarrow[\text{Catalyst}]{NH_3} R(CH_2NH_2)_2$$
$$R(CH_2NH_2)_2 + COCl_2 \xrightarrow{\Delta} R(CH_2NCO)_2 + 2HCl$$

The polymeric fat acids, useful as the starting materials for preparing the polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids includes branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters derived from the naturally occurring drying and semi-drying oils. Suitable drying and semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is preferred to employ as starting materials in the preparation of the polyisocyanates, relatively pure dimerized fat acids. Such acids can be obtained from mixtures containing monomer, the dimerized fat acids, trimerized fat acids and higher polymers by high vacuum distillation or solvent extraction. The use of relatively pure dimerized fat acids as a starting material is advantageous where a diisocyanate of high purity is desired. Relatively pure trimerized fat acids can be used where a triisocyanate of high purity is desired. Of course, mixtures of the polymerized fat acids can also be used to prepare mixtures of polyisocyanates. Any of the described unsaturated polymeric fat acids can be hydrogenated prior to the use thereof in the polyisocyanate preparation.

The following examples illustrate the preparation of the polyisocyanates useful in our invention.

EXAMPLE A

In a 1 liter, round bottom flask equipped with a reflux condenser protected by a calcium chloride drying tube were placed 200 g. of purified dimerized fat acid dissolved in 200 ml. of Skellysolve B and 65 g. of phosphorus trichloride. The dimerized fat acid was derived from the mixture of acids in tall oil and consisted mainly of dimerized linoleic and oleic acids. It had the following properties: wt. percent dimerized fat acid—99; wt. percent monomer—0.5; Neut. equiv.—286; and Sap. equiv.—280. The reaction mixture was heated under reflux for 2 hours and then allowed to stand overnight. The clear solution of the dimerized fat acid chloride was decanted from the heavy phosphorus acid. The solvent and excess phosphorus trichloride were removed under reduced pressure.

Into a 1 liter reaction flask equipped with cooling coils, stirrer and thermocouple was placed a solution of 30.4 g. sodium azide in 125 ml. water cooled to 10° C. To this rapidly stirred solution was added a solution of 100 g. of the dimerized fat acid chloride dissolved in 150 ml. of acetone. The reaction temperature was controlled at 10-15° C. during the addition and during a 1 hour period following addition, after which 200 ml. of heptane was added. The heptane layer was separated, washed with 2 portions of cold water, and then dried over magnesium sulfate. To 200 ml. heptane maintained at 65-70° C. was added the above dried heptane solution of the dimerized fat acyl azide. The solution was maintained at a temperature of 65-70° C. for 1 hour and then the heptane was evaporated at reduced pressure. There was obtained 70 g. liquid diisocyanate having the following formula:

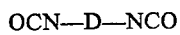
OCN—D—NCO where D is the dimeric fat radical derived from the starting dimerized fat acids.

EXAMPLE B

The preparation as described in Example A was repeated except that the dimerized fat acid chloride (94 g.) was dissolved in 140 ml. of heptane instead of acetone. There was obtained 63 g. of the diisocyanate.

EXAMPLE C

The preparation as described in Example A was repeated except that 213 g. of the dimerized fat acid chloride was dissolved in 300 ml. acetone. There was obtained 177 g. of the diisocyanate.

EXAMPLE D

Two hundred forty grams of phosgene (2.42 moles) were dissolved in 700 ml. of dry toluene with cooling in an ice bath to maintain the solution temperature below 5° C. The phosgene solution was then placed in a 2 liter, 3-neck flask equipped with a Dry Ice condenser, a stirrer and a funnel. A solution of 164.4 g. double distilled dimer amine (0.6 eq.) in 200 ml. toluene was placed in the funnel. The diamine was prepared by hydrogenating a dimer nitrile in the presence of ammonia and methanol-wet Raney nickel catalyst. The dimer nitrile was prepared from a dimerized fat acid derived from the mixture of acids in tall oil which acid consisted mainly of dimerized linoleic and oleic acids. The dimer amine had the following properties: wt. percent monomer—0.5; wt. percent dimer—98.5; wt. percent trimer—1.0; and Neut. equiv.—271.

The flask was warmed by using a heating mantle until a heavy reflux of phosgene was observed (40–50° C.). The dimer amine solution was then added slowly over a 1 hour period. After the addition was complete, the reaction mixture was refluxed for an additional 2 hours. The Dry Ice condenser was replaced with a water condenser and the temperature of the solution was raised slowly until the toluene began to reflux. The refluxing was continued for 6 hours after which the heating was discontinued and the solution allowed to cool to room temperature. The toluene was then removed under reduced pressure. There was obtained 181.4 g. of diisocyanate having the formula:

OCN—CH₂—D—CH₂—NCO where D is the dimeric fat radical derived from the starting dimerized fat acid. The diisocyanate was a light brown, oily liquid.

EXAMPLE E

The procedure of Example D was repeated except that the dimer amine was hydrogenated before the reaction. There was obtained 179 g. of saturated diisocyanate which had substantially the same properties as the diisocyanate of Example D but was lighter in color.

The wood may be treated with the described polyisocyanates by dissolving same in solvent and then applying the solution to the wood. A wide variety of non-reactive solvents can be employed. Representative of such solvents are benzene, xylene, toluene, methyl ethyl ketone, Cellosolve acetate and the like. It is especially preferred to use solvents which are volatile under ambient conditions. The wood may also be treated directly with the polyisocyanates. However, a more even distribution is obtained when the polyisocyanates are diluted with a solvent as described. Still further, a water emulsion of the polyisocyanate may be used. The polyisocyanates employed are stable in the presence of water for at least reasonably long periods of time and thus emulsions may be formed and used to treat the wood according to our invention. Emulsifiers may be used to assist in the formation of such emulsions. However, it is preferred to use the polyisocyanates directly or a solvent solution thereof.

Any wood may be treated by our process using the described polyisocyanates. However, our process is particularly advantageous for the treatment of softwoods such as fir, pine, spruce, redwood and the like. All of the surfaces of the wood may be impregnated or treated with the described polyisocyanates. However, our process is beneficial in treating only one surface or a portion thereof. The polyisocyanates are used in an amount sufficient to reduce the dimensional instability of the wood. It is preferred that the surface or surfaces to be treated are impregnated fairly uniformly with the polyisocyanates although the dimensional instability of the wood will be reduced by the use of even small amounts of the polyisocyanates and non-uniform impregnation. Amounts of from about 0.05 to 25% by weight of the polyisocyanate based on the weight of the outermost ¼ inch of the wood surface are preferred.

As indicated above, the process of our invention also preferably includes the use of a protective resinous coating over the polyisocyanate treated wood surfaces. Any conventional protective resinous coating can be used. Thus various paints, varnishes, shellacs and the like can be used. The base resinous material can be drying or semi-drying oils, acrylics, polyurethanes, epoxy resins and the like. One preferred group of coating materials are the polyureas derived from the described polyisocyanates and amines.

One especially preferred group of amines useful in the preferred coatings are polyamines having the primary amine group thereof blocked by ketimine or aldimine groups. The reaction of carbonyl compounds with the primary amine groups can be illustrated as follows:

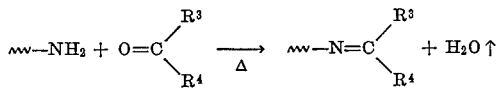

The useful carbonyl compounds may have the following theoretical structural formula:

where $R^3$ and $R^4$ are organic radicals, are each substantially inert to the ketimine or aldimine formation reaction and are preferably hydrogen or short chain alkyl groups (1 to 4 carbon atoms). Preferred carbonyl compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the blocked polyamine is mixed with the polyisocyanate and exposed to moisture, the freed aldehyde or ketone can be easily removed from the reaction mixture. Examples of preferred carbonyl compounds include such aldehydes and ketones as acetone, methylethyl ketone, methyl-n-butyl ketone, methyl-tert-butyl ketone, ethylisopropyl ketone, acetaldehyde, propionaldehyde, butyraldehyde, isobutyraldehyde, and the like (i.e. including hexanone and hexanal). The polyamines to be blocked preferably have the structure

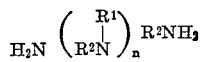

or

where $R^2$ is a difunctional aliphatic group containing from 2–48 carbon atoms, $R^1$ is an aliphatic group containing 1–24 carbon atoms and $n$ is an integer of from 0–20. Representative $R^1$ radicals are methyl, propyl, butyl, decyl, hexadecyl, hexenyl, octenyl, tridecenyl, octadecyl, undecynyl and the like. Inert or non-interfering groups such as Cl, nitro and the like may be present on $R^1$ and/or $R^2$.

Where the described blocked polyamines also contain secondary amine groups, the same are preferably reacted with an organic isocyanate in an amount sufficient to react with the secondary amine groups. Preferred isocyanates are the aliphatic, cycloaliphatic and araliphatic isocyanates. Typical polyisocyanates include the polymethylene diisocyanates such as ethylene diisocyanate, hexamethylene diisocyanate, etc.; other alkylene diisocyanates, such as butylene-2,3-diisocyanate, etc.; alkylidene diisocyanates, such as butylidene diisocyanate, etc.; cycloalkylene diisocyanates, such as cyclohexylene-1,4-diisocyanate, etc.; cycloalkylidene diisocyanates, such as cyclohexylidene diisocyanate, etc.; triisocyanates, such as 1,2,4 - butanetriisocyanate; aralphatic polyisocyanates, such as p-phenylene-2,2'-bis(ethyl isocyanate), 5-cyano phenylene-1,3-bis(propyl-3-isocyanate), etc.; aromatic polyisocyanates, such as tolylene diisocyanate, m-phenylene diisocyanate, diphenylene-4,4'-diisocyanate, etc.; and the polyisocyanates derived from polymeric fat acids as above described. Typical monoisocyanates are decylisocyanate, octadecylisocyanate, and the like.

The polyisocyanates derived from polymeric fat acids are applied to the wood as described and then the impregnated or treated wood is allowed to cure until the surface becomes hard and tack-free. Such curing may be accomplished by keeping the impregnated wood under ambient conditions for relatively long periods of time—i.e. 70° F. for several days. However, the impregnated wood is preferably heat cured at temperatures of 100–250° F. for a few minutes to several hours. In addition, the curing reaction can also be accelerated by the use of catalysts such as dibutyl tin dilaurate, stannous octoate, zinc octoate, stannic chloride, etc. Any catalyst which aids in the reaction of polyisocyanates with active hydrogen containing compounds can be used. After the noted curing has been completed the treated panels are preferably coated with the protective resinous coating as described above.

The following examples illustrate certain preferred embodiments of the invention but are not to be considered as limiting.

EXAMPLE I

Redwood panels (3″ x 6″ x ¼″) were impregnated by brushing dimeryl isocyanate onto the surface thereof. The dimeryl isocyanate was prepared as in Example D above and had the formula $$OCN-CH_2-D-CH_2-NCO$$

where D is the dimeric fat radical consisting mainly of the divalent hydrocarbon radicals of dimerized linoleic and oleic acids, said fat acids having been prepared by polymerizing the mixture of acids derived from tall oil. The impregnated panels were kept at ambient room temperature for one week. At that time they were dry to the touch and had a deep, satiny appearance. They were then exposed in a Twin Arc Weather-Ometer for a period of 344 hours. The panels showed little, if any, discoloration although there was some loss of gloss. Under the same conditions, untreated redwood panels are very discolored.

EXAMPLE II

Redwood and Douglas fir plywood panels (3″ x 6″ x ¼″) were immersed in a 20% by weight solution of dimeryl isocyanate (as used in Example I) in benzene for a period of ten minutes. The treated panels were allowed to dry overnight at room temperature and then were heat cured at 100° C. for 30 minutes.

The panels as treated above and similar untreated panels were then coated with a polyurea resin coating formulation prepared by blending the following components: 15.0 parts by weight dimeryl isocyanate (as used in Example I), 12.5 parts by weight mineral spirits, and 14.2 parts by weight of a ketone blocked polyamine. The latter component was prepared by reacting one mole diethylenetriamine with two moles methyl isobutyl ketone, the secondary amine group of the polyamine being blocked by reacting two moles of the above product with one mole of dimeryl isocyanate (as used in Example I). The ketone blocked polyamine has the following idealized, structural formula:

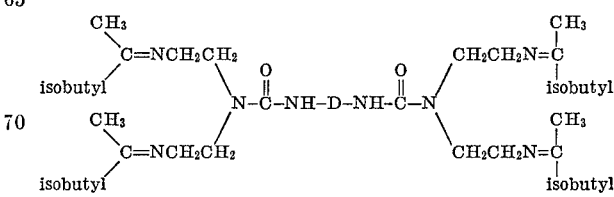

where D is the dimeric fat radical. Three coats of the polyurea resins coating formulation were applied to the treated and untreated panels with a 24 hour interval between coats (the redwood panels were coated on all surfaces while the Douglas fir plywood panels were coated on one side only). The coated panels were cured at 72° F. and 50% relative humidity for two weeks.

Both the coated, treated and the coated, untreated Douglas fir plywood panels were exposed to the following three different tests recommended by the American Plywood Association to test the durability of wood finishes:

(a) Immersion in water at room temperature for 8 hours followed by drying in an air-circulating oven for 16 hours at 145° F. This test was repeated 25 times.

(b) Immersion in boiling water for 4 hours followed by drying in an air-circulating oven for 20 hours at 145° F. This test was repeated 25 times.

(c) Immersion in water at room temperature for 8 hours then in a freezer at 0° F. for 16 hours followed by 24 hours of exposure in an air-circulating oven at 145° F. This test was repeated 10 times.

In all of the above tests the panels which were pretreated with the dimeryl isocyanate according to the present invention showed substantially more dimensional stability over the panels which were not so treated. The treated panels showed less color change and darkening. In addition, they showed much less cracking.

Both the coated, treated and coated, untreated redwood panels were exposed in a Twin Arc Weather-Ometer for a period of 1010 hours. The panels treated with the dimeryl isocyanate in accordance with the present invention showed much less discoloration and bleaching of the wood as compared to the coated but untreated panels.

It is to be understood that changes and variations may be made without departing from the spirit and scope of the invention.

What is claimed is:

1. A process of improving the dimensional stability of wood which comprises (1) impregnating the wood with an organic polyisocyanate having the formula

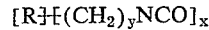

where $y$ is 0 or 1, $x$ is an integer of 2 to about 4 and R is the hydrocarbon group of polymeric fat acids prepared by polymerizing monobasic aliphatic carboxylic acids of 8 to 24 carbons and (2) curing the impregnated wood, said organic polyisocyanate being used in an amount sufficient to reduce the dimensional instability of the wood.

2. The process according to claim 1 wherein $y$ is 1 and $x$ is 2.

3. The process according to claim 1 wherein the impregnated wood is cured at temperatures of 100–250° F.

4. The process according to claim 1 wherein the wood is a softwood and the organic polyisocyanate is used as an organic solvent solution.

5. The process according to claim 1 wherein the impregnated and cured wood is coated with a protective resinous coating.

6. The process according to claim 5 wherein the protective resinous coating is a polyurea coating.

7. The process according to claim 6 wherein the polyurea coating is obtained by coating the surface of the impregnated and cured wood with a curable composition comprising a ketimine blocked polyamine and an organic polyisocyanate having the formula

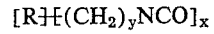

where $y$ is 0 or 1, $x$ is an integer of 2 to about 4 and R is the hydrocarbon group of polymeric fat acids prepared by polymerizing monobasic aliphatic carboxylic acids of 8 to 24 carbon atoms and curing the resulting coating, said ketimine blocked polyamine and polyisocyanate being used in amounts sufficient to form the polyurea coating.

8. A process of improving the dimensional stability of wood which comprises impregnating the wood with an organic diisocyanate having the formula

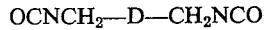

where D is the divalent hydrocarbon radical of a dimerized fat acid prepared by polymerizing a monobasic aliphatic carboxylic acid of 8 to 24 carbon atoms and curing the impregnated wood by heating same to temperatures of 100–250° F., said organic diisocyanate being used in an amount sufficient to reduce the dimensional instability of the wood.

9. The dimensionally stabilized wood prepared by the process of claim 1.

10. The dimensionally stabilized and polyurea coated wood prepared by the process of claim 8.

References Cited

UNITED STATES PATENTS

| | | | |
|---|---|---|---|
| 2,430,479 | 11/1947 | Pratt et al. | 117—148 X |
| 2,762,721 | 9/1956 | Wells | 117—149 X |
| 2,804,400 | 8/1957 | Kelly | 117—148 X |
| 2,811,470 | 10/1957 | Kenaga | 117—147 |
| 2,893,898 | 7/1959 | Evans et al. | 117—148 X |
| 3,096,208 | 7/1963 | Nyquist et al. | 117—138.8 |

FOREIGN PATENTS 579,340  12/1943  Great Britain.

MURRAY KATZ, Primary Examiner

W. R. TRENOR, Assistant Examiner

U.S. Cl. X.R.

117—72

PO-1050
(5/69)

UNITED STATES PATENT OFFICE
CERTIFICATE OF CORRECTION

Patent No. 3,481,774          Dated December 2, 1969

Inventor(s)  Marwan R. Kamal, Don E. Floyd

It is certified that error appears in the above-identified patent and that said Letters Patent are hereby corrected as shown below:

Column 8, line 35, "claim 8" should read -- claim 7 --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents